3,060,188
2:6-DIALKYL-4:8-DIHYDROXYBENZO[1:2:4:5]BIS-
IMIDAZOLES AND THE CORRESPONDING
QUINONES
Adrian Marxer, Muttenz, Switzerland, assignor to
Ciba Corporation, a corporation of Delaware
No Drawing. Filed Feb. 5, 1959, Ser. No. 791,288
Claims priority, application Switzerland Feb. 14, 1958
19 Claims. (Cl. 260—309.2)

This invention provides 2:6-dialkyl-4:8-dihydroxy-benzo[1:2:4:5] bis-imidazoles of the formula

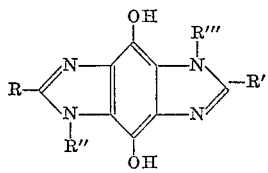

in which R and R' represent alkyl groups, especially lower alkyl groups, such as methyl, ethyl, propyl or butyl groups, and R" and R''' represent aliphatic radicals, and also the quinones of the above compounds having the formula

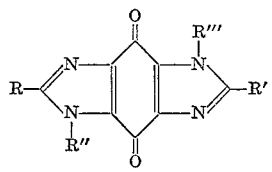

and salts and the quaternary ammonium compounds of the compounds of the above formula, and process for the manufacture of these compounds.

The aliphatic radicals present in the new imidazoles are advantageously unsubstituted or substituted alkyl groups in which the substituent may be, for example, a free or substituted amino group, a free or substituted hydroxyl group or a halogen atom. Substituted amino groups are more especially tertiary amino groups, such as di-lower-alkyl-amino, lower alkyl-cycloalkylamino, pyrrolidino, piperidino, morpholino, piperazino or hydroxyalkyl amino groups, substituted hydroxyl groups, for example, lower alkoxy or alkoxy-alkoxy groups. The aliphatic radicals may therefore be, for example, dimethylamino, diethyl-amino, N-cyclopentyl-N-methylamino, pyrrolidino, piperidino, piperazino, N-methyl-piperazino, N-(β-hydroxy-ethyl)-piperazino, morpholino, hydroxy, methoxy, ethoxy, β-hydroxyethoxy, or chloro- or bromo-ethyl, -propyl, -butyl or -amyl groups.

The invention provides more especial compounds of the formula

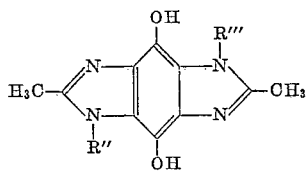

in which R" and R''' represent alkyl, oxyalkyl or aminoalkyl groups containing 1–20 carbon atoms, for example, methyl, ethyl, hydroxyethyl, propyl, undecyl, dodecyl, cetyl, dimethylamino-, diethylamino-, pyrrolidino-, piperidino-, morpholino- or piperazino-ethyl or -propyl groups, the corresponding quinones and salts of these compounds.

The new compounds have valuable pharmacological properties. Thus, they exhibit a favorable action in rheumatic diseases, they are active against protozoa, such as trypanosomes, they intensify the curative action of sulfonamides, and they check the development of bacteria, such as Bac. megath and Staph. aureus. They are therefore useful as medicaments. They can also be used as intermediate products for making medicaments.

The new compounds are obtained by subjecting hydroquinones of the formula

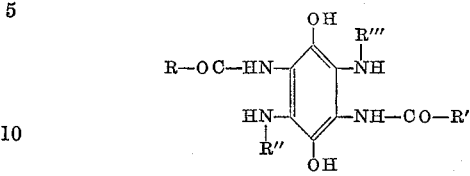

in which R—R''' have the meanings given above, or corresponding quinones, to ring closure to form the imidazole rings. The reaction is advantageously carried out by treatment with an acid, such as an aqueous or alcoholic mineral acid, for example, hydrochloric acid.

In this process the starting materials may also be formed under the reaction conditions. Thus, the corresponding tetra-aminoquinones can be reduced under acid conditions whereby ring closure takes place simultaneously.

When the aliphatic radicals in the new compounds contain exchangeable substituents, such as hydroxyl groups or halogen atoms, these substituents may be exchanged for other groups by methods in themselves known. Thus, a hydroxyl group may be halogenated or a halogen atom may be exchanged for an amino group.

Quinones so obtained may be reduced by a method in itself known, for example, by means of catalytically activated hydrogen or by treatment with a dithionite, to form the hydroquinones. Hydroquinones obtained by the process may be oxidized to the quinones in the usual manner, for example, by treatment with hexavalent chromium compounds, ferric salts, by treatment with oxygen or the like.

The benzo-bis-imidazoles so obtained may be converted into their quaternary ammonium salts in the ordinary way by treatment with quaternating agents, more especially reactive esters of alkanols or benzyl alcohols, and from the quaternary ammonium salts there may be obtained in the usual manner the corresponding bases or other salts thereof. Reactive esters for this purpose are especially those of strong inorganic or organic acids, such as hydrohalic acids or organic sulfonic acids, such as para-toluene sulfonic acid.

Depending on the procedure used the new compounds are obtained in the form of the free bases or their salts. From the salts the free bases can be obtained by methods in themselves known; and from the bases salts can be made by reaction with acids suitable for making therapeutically useful salts, for example, hydrohalic acids, sulfuric acid, nitric acid, phosphoric acid, thiocyanic acid, acetic acid, propionic acid, oxalic acid, malonic acid, succinic acid, malic acid, tartaric acid, nitric acid, methane sulfonic acid, ethane sulfonic acid, hydroxyethane sulfonic acid, benzene or toluene sulfonic acid, or therapeutically active acids.

The starting materials are known or can be made by methods in themselves known. The hydroquinones used in the process can be prepared, for example, by reduction of the quinones.

The invention also includes any modification of the process in which there is used as starting material a compound obtainable as an intermediate product at any stage of the process, and the remaining steps of the process are carried out.

The new compounds can be used as medicaments, for example, in the form of pharmaceutical preparations, which contain the new compounds or salts thereof in admixture with a pharmaceutical organic or inorganic solid or liquid carrier for enteral, parenteral or topical administration. For making the carriers there are used substances that do not react with the new compounds, for example, water, gelatine, lactose, starches, magnesium stearate, talc, vegetable oils, benzyl alcohols, gums, polyalkylene glycols, white petroleum jelly, cholesterol or other known carrier for medicaments. The pharmaceutical preparations may be in the form, for example, of tablets, dragees, salves, creams or in liquid form as solutions, suspensions or emulsions. If desired, they may be sterilized and/or may contain auxiliary substances, such as preserving, stabilizing, wetting or emulsifying agents, salts for regulating the osmotic pressure or buffers. They may also contain other therapeutically valuable substances.

The following examples illustrate the invention:

*Example 1*

14.72 grams of 2:5-di-acetamino-3:6-di-dodecylamino-benzoquinone are suspended in 250 cc. of absolute ethanol, 5 grams of Raney nickel are added, and the whole is agitated in an atmosphere of hydrogen. The temperature during the hydrogenation is 45–50° C. In a short time 560 cc. of hydrogen are absorbed. 200 cc. of chloroform are added to the reduction mixture, the mixture is boiled, and is then freed from nickel.

100 cc. of 2.4 N-alcoholic hydrochloric acid are added to the ethanol chloroform solution and the mixture is concentrated after being allowed to stand for a short time. The precipitated crystals of the dihydrochloride of 2:6-dimethyl-4:8-dihydroxy-1:5-didodecyl-benzo[1:2:4:5] bis-imidazole of the formula

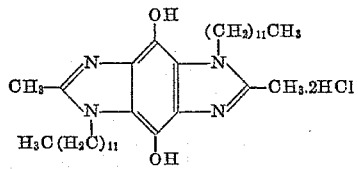

melt at 281° C. The mother liquor yields a further considerable quantity of the product. The latter is recrystallized from chloroform with the addition of ethanol and then melts at 297° C.

The starting material is prepared as follows:

43.6 grams of 3:6-dichloro-2:5-di-acetamino benzoquinone are suspended in 400 cc. of ethanol, and a mixture of 55.6 grams of dodecylamine and 40 grams of triethylamine in 200 cc. of ethanol are added dropwise at 50° C. The whole is stirred for 9 hours in a water bath having a temperature of 80° C., the thick magna is filtered with suction, and the filter residue is washed with ethanol, then suspended in water, and again filtered with suction and washed. The resulting 2:5-di-acetamino-3:6-diodecylamino-benzoquinone melts at 162–165° C. and is sufficiently pure for the reactions described above.

*Example 2*

26.17 grams of the dihydrochloride of 2:5-di-acetamino - 3:6 - di-(β-diethylamino - ethylamino)-benzoquinone are dissolved in 250 cc. of ethanol and 50 cc. of water, then 15 grams of Raney nickel are added, and the whole is agitated with hydrogen under slightly superatmospheric pressure. When the calculated quantity of hydrogen has been absorbed the nickel is removed by filtering with suction, and 150 cc. of 2.75 N-alcoholic hydrochloric acid are added to the clear solution. Ether is gradually added and the precipitated tetrahydrochloride of 2:6-dimethyl-4:8-dihydroxy - 1:5 - di-(β-diethylaminoethyl)-benzo[1:2:4:5]-bis-imidazole of the formula

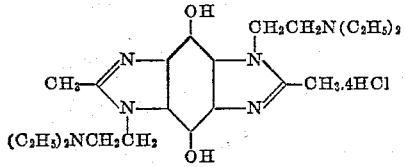

is isolated, and purified by dissolving it in ethanol with the addition of a small amount of water followed by precipitation with absolute ether. The product then melts at 308–310° C. The base, which melts at 198–201° C., can be precipitated from an aqueous solution of the tetrahydrochloride with sodium carbonate.

The starting material is obtained in the following manner:

29.1 grams of 3:6-dichloro-2:5-di-acetaminobenzoquinone are suspended in 250 cc. of ethanol and 25.6 grams of diethyl-ethylene-diamine in 75 cc. of ethanol are added dropwise at 10° C. The whole is stirred for 9 hours at room temperature and the crystals of the dihydrochloride of 2:5-di-acetamino-3:6-di-(β-diethylamino-ethylamino)-benzoquinone are filtered off with suction. The latter product melts at 207° C. and the free base melts at 217–219° C.

*Example 3*

23.93 grams of 2:5-di-acetamino-3:6-di-(β-morpholino-ethylamino)-benzoquinone are dissolved in 300 cc. of ethanol and 60 cc. of 1 N-hydrochloric acid and reduced with hydrogen in the presence of 15 grams of Raney nickel. When 1.12 liters of hydrogen have been absorbed, the mixture is filtered with suction through a carbon filter and the filter residue is washed with water. To the solution so obtained 270 cc. of a 2.4 N-alcoholic solution of hydrochloric acid are added. After a short time the greater part of the tetrahydrochloride separates out. A further quantity can be obtained from the mother liquor. The resulting tetrahydrochloride of 2:6-dimethyl-4:8 - di - hydroxy - 1:5 - di(β - morpholino-ethyl) - benzo-[1:2:4:5]-bis-imidazole decomposes in a melting point tube at 304–306° C. It has the formula

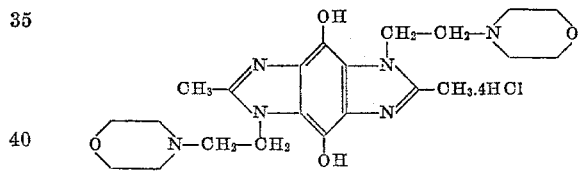

The free base can be obtained by adding a dilute solution of sodium carbonate to an aqueous solution of the tetrahydrochloride. During isolation it easily undergoes oxidation to the quinone melting at 244–246° C.

The starting material is obtainable in the following manner:

29.1 grams of 3:6-dichloro-2:5-di-acetamino-benzoquinone are suspended in 250 cc. of ethanol and there is slowly added dropwise at 5–10° C. a mixture of 25.3 grams of triethylamine and 28.6 grams of morpholino-ethylamine. The whole is stirred for 9 hours at room temperature, and the precipitated reddish brown crystals of 2:5-di-acetamino - 3:6-di-(β-morpholino-ethylamino)-benzoquinone melting at 215–217° C. are isolated. The dihydrochloride melting at 205–207° C. can be obtained from the base by means of alcoholic hydrochloric acid.

*Example 4*

5.51 grams of the dihydrochloride of 2:5-di-acetamino-3:6-di-(β-morpholino-ethylamino)-benzoquinone are suspended in 100 cc. of glacial acetic acid, 100 mg. of platinum oxide are added, and the reduction is carried out with hydrogen. 225 cc. of hydrogen are absorbed. The resulting suspension is separated from the mother liquor by filtering with suction. To the mother liquor are added 50 cc. of 2.4 N-alcoholic solution of hydrochloric acid, the whole is concentrated, a further portion of alcoholic hydrochloric acid is added, and the crystals are isolated and mixed with the main quantity of crystals, which are obtained as follows. The residue from the filtration of the suspension is dissolved in 40 cc. of 3 N-hydrochloric acid, then filtered to remove the platinum, absolute ethanol and 50 cc. of alcoholic hydrochloric acid are added and the precipitated crystals are isolated. In this manner there is obtained the tetrahydrochloride of 2:6-dimethyl-4:8-dihydroxy-1:5-di-(β-morpholino - ethyl) - benzo[1:2:4:5] - bis - imidazole described in Example 3.

*Example 5*

10 grams of the tetrahydrochloride of 2:6-dimethyl-4:8 - dihydroxy - 1:5 - di - (β - morpholino-ethyl)-benzo-[1:2:4:5] bis-imidazole, obtained as described in Example 3 or 4, are heated at the boil in 200 cc. of sulfuric acid of 40% strength and 10 grams of chromic acid are added to the mixture while hot. After two minutes the whole is cooled in ice, and the precipitated crystals are isolated. The latter consist of a chromium complex of the quinone obtained. The crystals are dissolved hot in 325 cc. of 2 N-sulfuric acid and 325 cc. of water. The solution is filtered, cooled to about 40° C., and precipitated with 600 cc. of a 2 N-solution of caustic soda. The fine orange-yellow needles are isolated. They melt at 243–246° C. They consist of 2:6-dimethyl-4:8-dioxo-4:8 - dihydro - 1:5-di - (β - morpholino - ethyl) - benzo-[1:2:4:5] bis-imidazole of the formula

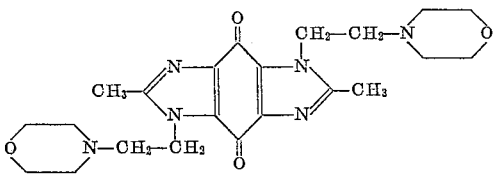

From the base, the dihydrochloride which melts above 300° C., can be obtained by means of alcoholic hydrochloric acid.

The same quinone base can be obtained by dissolving an aqueous solution of the tetrahydrochloride of 2:6-dimethyl - 4:8 - dihydroxy - 1:5 - di-(β-morpholino-ethyl)-benzo[1:2:4:5] bis-imidazole in a small amount of water, precipitating the base with a 2 N-solution of sodium carbonate and agitating the suspension with air for a short time. The initially colorless crystals soon become yellow and can be isolated by filtration with suction and washing.

*Example 6*

29.67 grams of 2:5-di-acetamino-3:6-di-n-butylamino-benzoquinone are suspended in 400 cc. of ethanol, 10 grams of Raney nickel are added and hydrogen is used for reduction. When 1.85 liters of hydrogen have been absorbed, 300 cc. of chloroform are added, the mixture is heated to the boil, filtered hot to remove nickel, and 100 cc. of a 2.4 N-alcoholic solution of hydrochloric acid are added. The solution is evaporated to ⅓ of its volume under reduced pressure, and the crystals so obtained are isolated. For purification they are dissolved in water with the addition of a small amount of 2 N-hydrochloric acid and precipitated with an equal volume of 6 N-hydrochloric acid. There is obtained the dihydrochloride of 2:6 - dimethyl - 4:8 - dihydroxy - 1:5 - di - n-butyl-benzo-[1:2:4:5] bis-imidazole of the formula

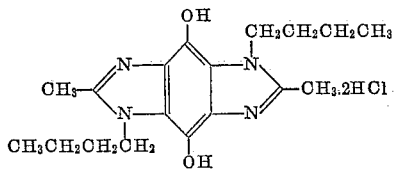

which melts at 310–313° with decomposition.

The 2:5 - di - acetamino-3:6-di-n-butylamino-benzoquinone is obtained in the manner described in Example 1 by using n-butylamine instead of dodecylamine. The product melts at 217–219° C.

*Example 7*

1 gram of the hydroquinone described in Example 6 is dissolved in 15 cc. of sulfuric acid of 40% strength, 1 gram of chromic acid is introduced into the mixture at the boil, and then the mixture is cooled. Ochre yellow crystals of the chromium complex precipitate out which must be decomposed. For this purpose the product is dissolved hot with 2 N-sulfuric acid and precipitated with an excess of 10% of caustic soda solution and immediately extracted with ether. From the ether the orange colored quinone crystallizes, namely 2:6-dimethyl-4:8-dioxo - 4:8 - dihydro - 1:5-di-n-butyl-benzo[1:2:4:5] bis-imidazole of the formula

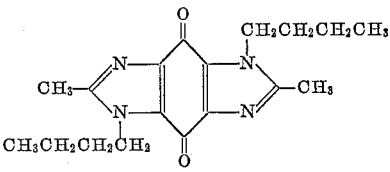

melting at 181–183° C.

*Example 8*

14.01 grams of 2:5-di-acetamino-3:6-di-methylamino-benzoquinone are suspended in 300 cc. of ethanol and hydrogenated with 10 grams of Raney nickel. 1.12 liters of hydrogen are absorbed. The suspension is filtered with suction and the filter residue is extracted at the boil with 300 cc. of chloroform, the chloroform solution is filtered to remove the nickel, and 100 cc. of 2.3 N-alcoholic hydrochloric acid and 350 cc. of ethyl acetate are added to the filtered solution. In this manner crystals of 2:6-dimethyl - 4:8 - dihydroxy - 1:5 - dimethyl-benzo[1:2:4:5] bis-imidazole precipitate as a hydrochloride which melts above 300° C. and has the formula

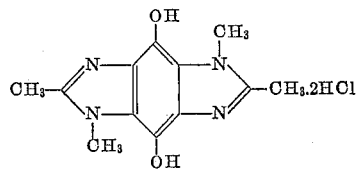

The base, which is obtained by adding a 2 N-solution of sodium carbonate to an aqueous solution of the dihydrochloride, melts above 300° C.

The 2:5-di-acetamino-3:6-dimethylaminobenzoquinone is obtained by the method described in Example 1, except that the mixture is cooled, instead of being heated to 50° C.

*Example 9*

29.1 grams of 3:6 - dichloro-2:5 - di-acetaminobenzoquinone are suspended in 250 cc. of ethanol, and a mixture of 25.3 grams of triethylamine and 25.6 grams of diethyl-ethylene diamine in 75 cc. of ethanol is added while cooling. The whole is stirred for 9 hours at room temperature. The 2:5-diacetamino - 3:6 - di - (β-diethyl-amino-ethylamino)-benzoquinone so obtained is filtered off with suction and to the clear ethanolic solution 150 cc. of 2.4 N-alcoholic hydrochloric acid are added. Upon standing overnight copious crystals melting at 256° C. are formed. These consist of a mixture of which the components are separated from one another as follows: The isolated and washed crystals are dissolved in 150 cc. of water, 150 cc. of 2 2N-solution of caustic soda are added to the solution, the yellow-brown crystals are separated from the violet mother liquor, and washed with water. In this manner fine whitish yellow needles are obtained, which become deep yellow when ethanol is poured over them. The product melts at 208–210° C. An excess of alcoholic hydrochloric acid is added to an ethanolic solution of the crystals whereupon bright yellow crystals melting at 283–286° C. (with decomposition) separate out. The base melting at 208–210° C. is 2:6-dimethyl-4:8-dioxo-4:8-dihydro-1:5-di-(β-diethylaminoethyl) - benzo[1:2:4:5] bis-imidazole having the formula

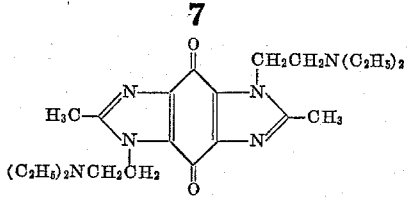

Example 10

1 gram of the tetrahydrochloride of 2:6-dimethyl-4:8-dihydroxy-1:5-di-(β-diethylaminoethyl)-benzo[1:2:4:5]bis-imidazole obtained as described in Example 2 is dissolved in 25 cc. of water, and oxidized by introducing oxygen for 2 hours. The yellow solution is precipitated with 20 cc. of a 2 N-solution of caustic soda, and the fine crystalline needles are isolated and washed. According to its melting point, mixed melting point and the melting point of its hydrochloride, the product is identical with the quinone obtained as described in Example 9.

The same quinone is obtained by oxidizing the base precipitated from the aforesaid hydroquinone with sodium carbonate solution with a current of oxygen. The quinone can also be obtained by oxidation with chromic acid in sulfuric acid of 40% strength and disintegration of the chromium complex with dilute caustic soda solution.

Example 11

15 grams of the tetrahydrochloride of 2:6-dimethyl-4:8-dihydroxy-1:5-di-(β-diethylamino-ethyl)-benzo-[1:2:4:5]bis-imidazole, obtained as described in Example 2, are dissolved in 150 cc. of water, and oxygen is introduced for 5 hours. The reaction mixture is rendered alkaline with 100 cc. of sodium hydroxide solution and treated for a further 3 hours with oxygen. The yellow precipitate is suction-filtered, washed with water and dried in vacuo. There is obtained 2:6-dimethyl-4:8-dioxo-4:8-dihydro-1:5-di-(β-diethylamino-ethyl)-benzo-[1:2:4:5]bis-imidazole melting at 208-210° C.

Example 12

26.6 grams of 2:5-diacetamino-3:6-diethanolaminobenzoquinone are suspended in 100 cc. of ethanol, 20 grams of Raney nickel are added and the whole is agitated with hydrogen. After 1.75 liters have been taken up, the absorption of hydrogen ceases. The catalyst and precipitated substance are suction-filtered. The alcoholic solution contains only a little of the desired product. The main portion is obtained from the filter residue as follows: The residue is boiled with 60 cc. of 6 N-hydrochloric acid, 60 cc. of water and 100 cc. of ethanol for 5 minutes, suction-filtered while hot, and to the green filtrate there are added 150 cc. of 2.3 N-ethanolic hydrochloric acid. The reaction mixture is evaporated in vacuo to a volume of about 120 cc., and 250 cc. of ethanol and 200 cc. of ethyl acetate are added. White crystals melting at 287-290° C. with decomposition are obtained. The product is the dihydrochloride of 2:6-dimethyl-4:8-dihydroxy-1:5-di-(β-hydroxy-ethyl)-benzo[1:2:4:5]bis-imidazole of the formula

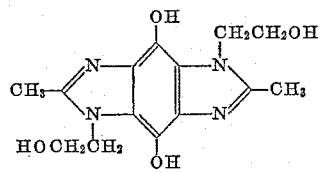

The starting material is prepared as follows:

29.1 grams of 2:6-dichloro-2:5-diacetamino-benzoquinone are suspended in 250 cc. of ethanol, and a mixture of 23.3 grams of triethylamine and 13.5 grams of ethanolamine in 75 cc. of ethanol is added dropwise with ice-water cooling. The whole is stirred for 9 hours at room temperature, the reaction product isolated, washed with ethanol, suspended in 100 cc. of water and isolated again. It melts at 241-243° C.

Example 13

5.4 grams of 2:6-dimethyl-4:8-dioxo-4:8-dihydro-1:5-di-(β-diethylamino-ethyl)-benzo[1:2:4:5]bis-imidazole are dissolved in 150 cc. of absolute ethanol, and 4.1 grams of methyl iodide in 25 cc. of ethanol are added dropwise and the whole is boiled under reflux for 6 hours. The precipitated crystals are isolated and dried. The resulting 2:6-dimethyl-4:8-dioxo-4:8-dihydro-1:5-di-(β-diethylamino-ethyl)-benzo[1:2:4:5]bis-imidazole-dimethoiodide of the formula

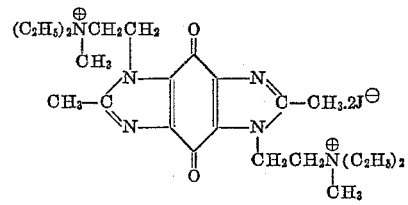

melts at 259-261° C.

Example 14

4.1 grams of 2:6-dimethyl-4:8-dioxo-4:8-dihydro-1:5-di-(β-diethylamino-ethyl)-benzo[1:2:4:5]bis-imidazole are dissolved in 200 cc. of ethanol, 4 grams of Raney nickel are added and the whole agitated with hydrogen. Hydrogenation ceases after 220 cc. of hydrogen have been taken up.

The mixture is filtered off from the catalyst with the exclusion of oxygen, to the clear mother liquor there are added 50 cc. of 2.3 N-ethanolic hydrochloric acid and the reaction mixture is evaporated to half its volume, whereupon crystallization sets in. The Raney nickel residue is boiled with a mixture of 10 cc. of hydrochloric acid (1:1), 10 cc. of water and 25 cc. of ethanol, filtered while hot, 25 cc. of ethanolic hydrochloric acid and 50 cc. of ethanol are added to the filtrate, whereupon crystallization sets in. The combined crystals are isolated, washed with ethanol and dried. The product is the tetrahydrochloride of 2:6-dimethyl-4:8-dihydroxy-1:5-di-(β-diethylamino-ethyl)-benzo[1:2:4:5]bis-imidazole.

Example 15

1 gram of the dihydrochloride of 2:6-dimethyl-4:8-dihydroxy-1:5-di-(β-hydroxy-ethyl)-benzo[1:2:4:5]bis-imidazole described in Example 12 is dissolved in 10 cc. of water and treated with a current of oxygen. After a short time the solution becomes turbid and yellow crystals of 2:6-dimethyl-4:8-dioxo-4:8-dihydro-1:5-di-(β-hydroxyethyl)-benzo[1:2:4:5]bis-imidazole of the formula

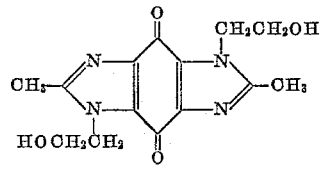

precipitate which are isolated. Melting point: 300° C.

What is claimed is:

1. A member selected from the group consisting of 2:6-dialkyl-4:8-dihydroxy-benzo[1:2:4:5]bis-imidazoles of the formula

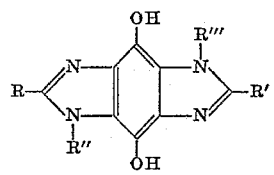

in which R and R' represent lower alkyl groups and R'' and R''' each represent a member selected from the group consisting of alkyl, amino-alkyl, oxy-alkyl and halo-alkyl, each of said alkyl groups having 1 to 20 carbon atoms, the quinones corresponding to the above compounds and having the formula

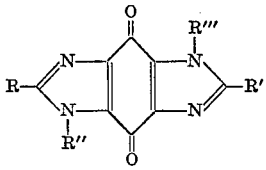

and therapeutically useful acid addition salts, lower alkyl quaternary ammonium salts and benzyl quaternary ammonium salts thereof.

2. 2:6-dimethyl-4:8-dihydroxy-benzo[1:2:4:5]bis-imidazoles of the formula

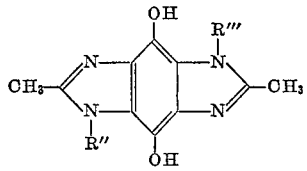

in which R'' and R''' each represent alkyl having from 1 to 20 carbon atoms.

3. 2:6-dimethyl-4:8-dihydroxy-benzo[1:2:4:5]bis-imidazoles of the formula

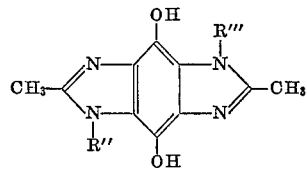

in which R'' and R''' each represent hydroxy-lower alkyl.

4. 2:6-dimethyl-4:8-dihydroxy-benzo[1:2:4:5]bis-imidazoles of the formula

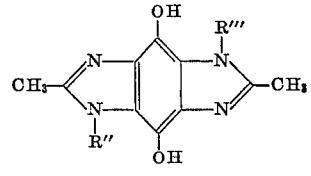

in which R'' and R''' each represent di-lower alkylamino-lower alkyl.

5. Therapeutically useful acid addition salts of the compounds of claim 2.

6. Therapeutically useful acid addition salts of the compounds of claim 3.

7. Therapeutically useful acid addition salts of the compounds of claim 4.

8. 2:6-dimethyl-4:8-dioxo-4:8-dihydro-benzo [1:2:4:5] bis-imidazoles of the formula

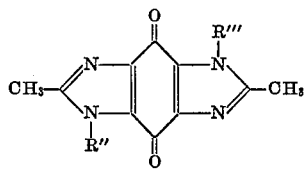

in which R'' and R''' each represents alkyl having from 1 to 20 carbon atoms.

9. 2:6-dimethyl-4:8-dioxo-4:8-dihydro-benzo [1:2:4:5] bis-imidazoles of the formula

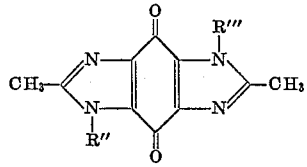

in which R'' and R''' each represent hydroxy-lower alkyl.

10. 2:6-dimethyl-4:8-dioxo-4:8-dihydro-benzo [1:2:4:5] bis-imidazoles of the formula

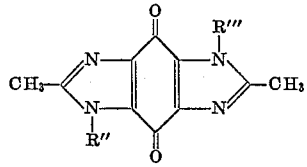

in which R'' and R''' each represent di-lower alkyl-amino-lower alkyl.

11. Therapeutically useful acid addition salts of the compounds of claim 10.

12. 2:6-dimethyl-4:8-dihydroxy-1:5 - di - (β-diethyl-amino-ethyl)-benzo [1:2:4:5] bis-imidazole.

13. 2:6-dimethyl-4:8-dihydroxy-1:5-di-lauryl - benzo [1:2:4:5] bis-imidazole.

14. 2:6-dimethyl-4:8-dihydroxy-1:5-di-n-butyl - benzo [1:2:4:5] bis-imidazole.

15. 2:6-dimethyl-4:8-dioxo-4:8-dihydro-1:5 - di - n-butyl-benzo [1:2:4:5] bis-imidazole.

16. 2:6-dimethyl-4:8-dihydroxy-1:5-dimethyl - benzo [1:2:4:5] bis-imidazole.

17. 2:6-dimethyl-4:8-dioxo-4:8-dihydro-1:5 - di - (β-diethylamino-ethyl)-benzo [1:2:4:5] bis-imidazole.

18. 2:6-dimethyl-4:8-dihydroxy-1:5 - di - (β-hydroxy-ethyl)-benzo [1:2:4:5] bis-imidazole.

19. 2:6-dimethyl-4:8-dioxo-4:8-dihydro - 1:5 - di - (β-hydroxy-ethyl)-benzo [1:2:4:5] bis-imidazole.

References Cited in the file of this patent
UNITED STATES PATENTS

| | | |
|---|---|---|
| 2,697,713 | Arnold | Dec. 21, 1954 |
| 2,728,776 | Schenck | Dec. 27, 1955 |
| 2,862,966 | Surrey | Dec. 2, 1958 |
| 2,862,967 | Surrey | Dec. 2, 1958 |

UNITED STATES PATENT OFFICE
CERTIFICATE OF CORRECTION

Patent No. 3,060,188            October 23, 1962

Adrian Marxer

It is hereby certified that error appears in the above numbered patent requiring correction and that the said Letters Patent should read as corrected below.

Column 2, line 55, for "nitric" read -- citric --; column 10, line 8, for "R''", second occurrence, read -- R''' --

Signed and sealed this 28th day of April 1964.

(SEAL)
Attest:

ERNEST W. SWIDER
Attesting Officer

EDWARD J. BRENNER
Commissioner of Patents